US011927207B2

(12) United States Patent
Okutani et al.

(10) Patent No.: US 11,927,207 B2
(45) Date of Patent: Mar. 12, 2024

(54) WORKING CONTROL DEVICE IN WORKING VEHICLE

(71) Applicant: Takeuchi Mfg. Co., Ltd., Nagano (JP)

(72) Inventors: Shumpei Okutani, Ueda (JP); Yuta Kobayashi, Tomi (JP); Koichi Shimizu, Ueda (JP)

(73) Assignee: Takeuchi Mfg. Co., Ltd., Nagano (JP)

( * ) Notice: Subject to any disclaimer, the term of this patent is extended or adjusted under 35 U.S.C. 154(b) by 203 days.

(21) Appl. No.: 17/559,704

(22) Filed: Dec. 22, 2021

(65) Prior Publication Data

US 2023/0032738 A1 Feb. 2, 2023

(30) Foreign Application Priority Data

Jul. 29, 2021 (JP) ................................ 2021-124553
Sep. 28, 2021 (JP) ................................ 2021-157321

(51) Int. Cl.
*F15B 15/18* (2006.01)
*E02F 9/22* (2006.01)
*E02F 9/20* (2006.01)

(52) U.S. Cl.
CPC ............ *F15B 15/18* (2013.01); *E02F 9/2203* (2013.01); *E02F 9/2228* (2013.01); (Continued)

(58) Field of Classification Search
CPC ........ F04B 23/06; F15B 15/18; E02F 9/2203; E02F 9/2228; E02F 9/2271; E02F 9/2004; E02F 9/2285; E02F 9/2292; E02F 9/2296
See application file for complete search history.

(56) References Cited

U.S. PATENT DOCUMENTS

2005/0001567 A1* 1/2005 Yoshimatsu ............ F04B 23/06 318/34
2007/0229007 A1* 10/2007 Morinaga ............ E02F 9/2075 318/268
(Continued)

FOREIGN PATENT DOCUMENTS

JP 5371210 B2 12/2013

OTHER PUBLICATIONS

The extended European search report issued by the European Patent Office dated Jun. 27, 2022, which corresponds to European Patent Application No. 22150205.7-1002 and is related to U.S. Appl. No. 17/559,704.

*Primary Examiner* — Connor J Tremarche
(74) *Attorney, Agent, or Firm* — Studebaker & Brackett PC

(57) ABSTRACT

A working control device comprises an operation lever for making a boom cylinder (36), an arm cylinder (37) and others work to drive a shovel apparatus (30), and a delivered oil amount control device (a controller (150)). A working oil supply source includes a first electric motor (M1) and a first hydraulic pump (P1). When the operation lever is subjected to a single operation, a number of the motor revolution based on the lever operation is set to control the first electric motor. When the number of motor revolution is less than a necessary minimum number of revolutions, the necessary minimum number is set to control the first electric motor (M1). When the operation lever is subjected to a composite operation, a total number of motor revolutions based on the lever operations is set. When the total number is less than a necessary minimum number of revolutions, the necessary minimum number is set to control the first electric motor (M1).

8 Claims, 8 Drawing Sheets

(52) U.S. Cl.
CPC .......... *E02F 9/2267* (2013.01); *E02F 9/2271* (2013.01); *E02F 9/2004* (2013.01); *E02F 9/2285* (2013.01); *E02F 9/2292* (2013.01); *E02F 9/2296* (2013.01)

(56) References Cited

U.S. PATENT DOCUMENTS

| | | | | |
|---|---|---|---|---|
| 2020/0318319 | A1 | 10/2020 | Shimizu et al. | |
| 2021/0025139 | A1 * | 1/2021 | Legner .................... | B60L 1/003 |

* cited by examiner

WORKING CONTROL DEVICE IN WORKING VEHICLE

TECHNICAL FIELD

The present invention relates to a working control device in a working vehicle.

TECHNICAL BACKGROUND

As a working vehicle, a hydraulic shovel (excavator) has been known. The hydraulic shovel is configured to comprise a lower travelling unit having left and right crawler mechanisms, an upper turning body pivotally provided on the lower travelling unit, and a shovel device provided on the front of the upper turning body. As the hydraulic shovel, a hydraulic shovel configured to comprise a power supply unit including a battery and an inverter, an electric motor to be driven upon receipt of power from the power supply unit, a hydraulic pump to be driven by the electric motor, and a plurality of hydraulic actuators (a hydraulic motor, a hydraulic cylinder, etc.) that are worked upon receipt of working oil to be discharged from the hydraulic pump and to make a crawler mechanism, a shovel device, and the like work using the hydraulic actuators and perform travelling, excavation work, and the like has been known (see, e.g., Japanese Patent Publication No. 5371210).

Examples of the hydraulic actuator include a travelling motor that makes the crawler mechanism work, a turning motor that turns the upper turning body, a boom cylinder, an arm cylinder, a bucket cylinder, and a swing cylinder that make the shovel device work, and a blade cylinder that moves a blade up and down. Although the hydraulic pump supplies working oil to the plurality of actuators, not only a single operation for making one of the plurality of hydraulic actuators work at the time of selection but also a composite operation for making two or more of the plurality of hydraulic actuators compositely work is performed as a lever operation by an operator. In view of this, Japanese Patent Publication No. 5371210 discloses that rotation control of the electric motor is performed depending on an operation state and an operation content of an operation device.

SUMMARY OF THE INVENTION

Problems to be Solved by the Invention

When a hydraulic pump is driven by an electric motor, the power consumption of the electric motor is required to be suppressed as much as possible based on a relationship with a battery capacity, for example. Accordingly, control to suppress driving power by changing driving rotation of the electric motor to correspond to an operation amount of an operation lever has conventionally been performed. At this time, a number (speed) of driving revolutions of the hydraulic pump is required to be a necessary minimum number of revolutions (e.g., approximately 500 to 700 r.p.m.) or more from a performance requirement of the hydraulic pump. Accordingly, as driving control of the electric motor, control to drive the electric motor in a necessary minimum number of revolutions required for the hydraulic pump is performed even when an amount of supplied oil required by a hydraulic actuator is small so that the electric motor may be driven in a required number of revolutions or less in a region where the operation amount of the operation lever is small (a fine operation region).

Such driving control of the electric motor is also similarly performed in both cases where the operation lever is singly operated and compositely operated. When the operation lever is compositely operated, working oil needs to be supplied to a plurality of hydraulic actuators, so that control to drive the electric motor has been performed depending on a total number of motor revolutions obtained by summing required numbers of revolutions respectively corresponding to operations in the composite operation. However, in such control, when an operation amount in the composite operation is small (in the fine operation region), a sum of the necessary minimum numbers of revolutions is the total number of motor revolutions. Accordingly, there is a problem that the number of motor revolutions is larger than necessary so that the power consumption of the electric motor increases.

The present invention has been made in view of such a problem, and is directed to making it possible to suppress the power consumption of an electric motor by suppressing a number of motor driving revolutions to a minimum necessary when an operation amount is small in a composite operation.

Means to Solve the Problems

To attain the above-described object, a working control device according to the present invention is a working control device in a working vehicle (e.g., a hydraulic shovel 1 in the embodiment) comprising a hydraulic working device (e.g., a crawler mechanism 15, an upper turning body 20, and a shovel device 30 in the embodiment), the working control device being configured to comprise a plurality of hydraulic actuators (e.g., travelling motors 16L and 16R, a swing cylinder 34, a boom cylinder 36, an arm cylinder 37, a bucket cylinder 38, and a blade cylinder 19 in the embodiment) for driving the hydraulic working device, an operation device for making the plurality of hydraulic actuators selectively or compositely work to drive the hydraulic working device, a working oil supply source that delivers working oil for driving the plurality of hydraulic actuators, and a delivered oil amount control device that controls an amount of oil to be delivered from the working oil supply source (e.g., a controller 150 in the embodiment). Further, the working oil supply source includes an electric motor (e.g., a first electric motor M1 in the embodiment) and a hydraulic pump (e.g., a first hydraulic pump P1 in the embodiment) to be driven by the electric motor, and the delivered oil amount control device is configured to perform rotation control of the electric motor according to an operation of the operation device to control an amount of oil to be delivered from the hydraulic pump. When the operation device is subjected to a single operation for making any one of the plurality of hydraulic actuators selectively work, a number (speed) of operation-corresponding motor revolutions corresponding to an operation amount of the operation device is set, and a necessary minimum number of revolutions is set instead of the number of operation-corresponding motor revolutions when the number of operation-corresponding motor revolutions is the necessary minimum number of revolutions or less, to perform driving control of the electric motor such that the number of revolutions thus set is obtained. On the other hand, when the operation device is subjected to a composite operation for making two or more of the plurality of hydraulic actuators compositely work, a total number of motor revolutions obtained by summing numbers of operation-corresponding motor revolutions respectively corresponding to operation amounts in the composite operation is set, and the necessary minimum number of revolutions is set instead of the total number of motor revolutions when the total number of motor revolutions is the necessary minimum number of revolutions or less, to perform driving control of the electric motor such that the number of revolutions thus set is obtained.

In the working control device having the above-described configuration, the necessary minimum number of revolutions is preferably a minimum number of driving revolutions found when the hydraulic pump is driven.

In the working control device having the above-described configuration, the number of operation-corresponding motor revolutions set when the operation device is singly operated is preferably set for each of the plurality of hydraulic actuators.

In the working control device having the above-described configuration, the numbers of operation-corresponding motor revolutions set when the operation device is compositely operated are preferably respectively set for the plurality of hydraulic actuators.

In the working control device having the above-described configuration, when the operation device is subjected to the composite operation for making two or more of the plurality of hydraulic actuators compositely work, a value obtained by multiplying a value obtained by summing the numbers of operation-corresponding motor revolutions respectively corresponding to the operation amounts in the composite operation by a predetermined coefficient K ($K<1.0$) is preferably set as the total number of motor revolutions.

The working control device having the above-described configuration preferably further comprises a plurality of working oil supply control valves that are respectively provided in an oil path leading to the plurality of hydraulic actuators from the hydraulic supply source and each perform working oil supply control to the corresponding hydraulic actuator among the plurality of hydraulic actuators according to a selective or composite operation of the plurality of hydraulic actuators.

In the working control device having the above-described configuration, the hydraulic pump is preferably a fixed-capacity-type hydraulic pump.

In the working control device having the above-described configuration, the hydraulic pump is preferably a variable-capacity-type hydraulic pump.

Advantageous Effects of the Invention

With a working control device in a working vehicle according to the present invention, when an operation device is compositely operated, a total number of motor revolutions obtained by summing numbers of operation-corresponding motor revolutions respectively corresponding to operation amounts in a composite operation is set, and a necessary minimum number of revolutions is set instead of the total number of motor revolutions when the total number of motor revolutions is the necessary minimum number of revolutions or less, to perform driving control of the electric motor such that the number of revolutions thus set is obtained, thereby making it possible to suppress a number of motor driving revolutions to a minimum necessary to suppress the power consumption of an electric motor when the operation amount is small in the composite operation while setting a number of driving revolutions of a hydraulic pump as a necessary minimum number of revolutions or more.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below and the accompanying drawings which are given by way of illustration only and thus are not limitative of the present invention.

DESCRIPTION OF THE EMBODIMENTS

An embodiment of the present invention will be described below with reference to the drawings. The present embodiment describes a crawler type of hydraulic shovel (excavator) as an example working vehicle comprising a working control device according to the present invention. First, the entire configuration of the hydraulic shovel 1 will be described principally with reference to FIG. 1.

Figure 1:
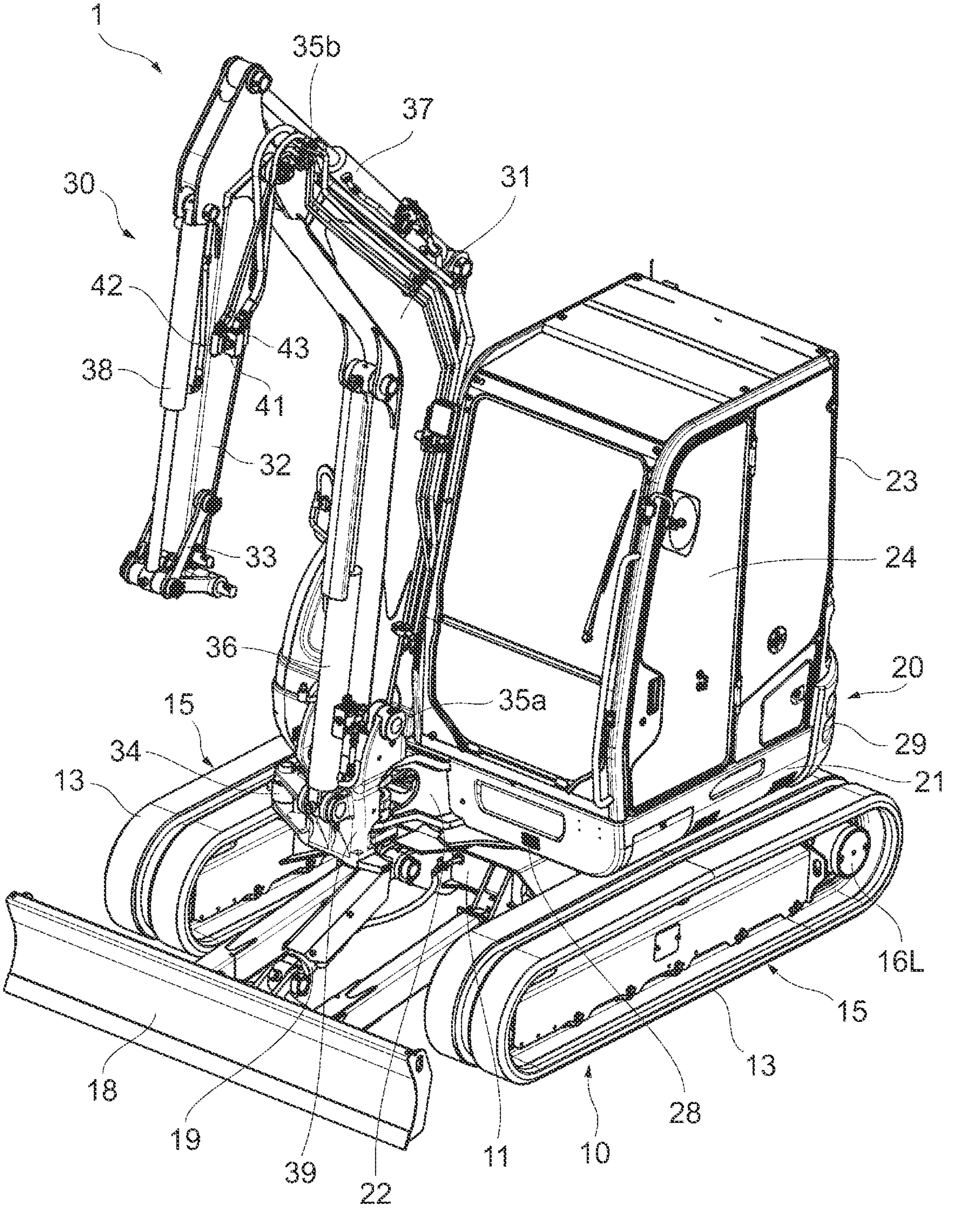
FIG. 1 is a perspective view of a hydraulic shovel comprising a working control device according to the present invention.

The hydraulic shovel 1 is configured to comprise a lower travelling unit 10 being capable of travelling, an upper turning body 20 horizontally pivotally provided on the top of the lower travelling unit 10, and a shovel device 30 provided on the front of the upper turning body 20 as shown in FIG. 1. The lower travelling unit 10, the upper turning body 20, and the shovel device 30 are driven by hydraulic actuators.

The lower travelling unit 10 comprises a pair of left and right crawler mechanisms 15 on both right and left sides of a lower travelling unit frame 11 which each have a drive wheel, a plurality of slave wheels, and a crawler belt 13 placed around these wheels. The left and right crawler mechanisms 15 comprise left and right travelling motors 16L, 16R (hydraulic actuators) to rotationally drive the drive wheels. The lower travelling unit 10 can travel in any direction and at any speed by controlling the rotational direction and rotational speed of the right and left travelling motors 16L, 16R. A blade 18 is vertically swingably provided on the front of the lower travelling unit frame 11. The blade 18 is vertically swingable by extending and contracting a blade cylinder 19 (a hydraulic actuator) provided across between the lower travelling unit frame 11 and the blade 18.

A turning mechanism is provided in the center of the top of the lower travelling unit frame 11. This turning mechanism comprises an inner race fixed to the lower travelling unit frame 11, an outer race fixed to the upper turning body 20, a turning motor 26 (a hydraulic actuator, see FIG. 2) provided in the upper turning body 20, and a swivel joint for supplying working oil from a hydraulic pump provided in the upper turning body 20 to the right and left travelling motors 16L, 16R and blade cylinder 19 provided in the lower travelling unit 10. The upper turning body 20 is horizontally pivotally attached via this turning mechanism to the lower travelling unit frame 11 and is turnable in right and left directions with respect to the lower travelling unit 10 by working the turning motor 26 to rotate normally or reversely. A main-body-side bracket 22 protruding forward is provided on the front of the upper turning body 20.

The shovel device 30 includes a boom bracket 39 attached to be swingable in right and left directions with a vertical axis as the center to the main-body-side bracket 22, a boom 31 attached to be vertically swingable (up/down movable) via a first swing pin 35*a* to the boom bracket 39, an arm 32 attached to be vertically swingable (bend/stretchable) via a second swing pin 35*b* to the tip of the boom 31, and a link mechanism 33 provided on the tip of the arm 32. The shovel device 30 further includes a swing cylinder 34 (a hydraulic actuator) provided across between the upper turning body 20 and the boom bracket 39, a boom cylinder 36 (a hydraulic actuator) provided across between the boom bracket 39 and the boom 31, an arm cylinder 37 (a hydraulic actuator) provided across between the boom 31 and the arm 32, and a bucket cylinder 38 (a hydraulic actuator) provided across between the arm 32 and the link mechanism 33.

The boom bracket 39 is swingable in right and left directions with respect to the upper turning body 20 (the main-body-side bracket 22) by working the swing cylinder 34 to extend and contract. The boom 31 is swingable upward and downward (up/down movable) with respect to the main-body-side bracket 22 (the upper turning body 20) by working the boom cylinder 36 to extend and contract. The arm 32 is swingable upward and downward (bend/stretchable) with respect to the boom 31 by working the arm cylinder 37 to extend and contract.

Various attachments as hydraulic working devices such as a bucket, breaker, crusher, cutter, and auger device can be vertically swingably attached to the tip of the arm 32 and the link mechanism 33. The attachment attached to the tip of the arm 32 is vertically swingable with respect to the arm 32 via the link mechanism 33 by working the bucket cylinder 38 to extend and contract. First to third attachment connection ports 41 to 43 to which can be connected a hydraulic hose for supplying working oil to the hydraulic actuator of these attachments are provided on both left and right side surfaces of the arm 32.

The upper turning body 20 includes a turning frame 21 on the front of which the main-body-side bracket 22 is provided and an operator cabin 23 provided on the turning frame 21. The operator cabin 23 forms an operator room in a substantially rectangular box shape in which an operator can get and is provided at the left side with a cabin door 24 which can be laterally opened and closed. Inside the operator cabin 23, there are provided an operator seat on which the operator sits facing forward, a display device to display a variety of vehicle information of the hydraulic shovel 1, and various operation switches to be operated by the operator. Further, inside the operator cabin 23, there are provided an operation device 160 (see FIG. 2) which is operated to work hydraulic actuators and a working gain setting indicator 170 (see FIG. 2) which is operated to set working speed gains of the hydraulic actuators. The operation device 160 has, as its operation portion to be operated by the operator, left and right travel operation levers or travel operation pedals (none are shown) with which to work the lower travelling unit 10 to travel, left and right work operation levers 161, 162 (see FIG. 2) with which to operate the upper turning body 20 and the shovel device 30 to work, and a blade operation lever (not shown) with which to operate the blade 18 to work.

In the hydraulic shovel 1, an operator gets in the operator cabin 23 and inclines backward and forward in operation the left and right travel operation levers (or travel operation pedals), thereby making the left and right crawler mechanisms 15 (the left and right travelling motors 16L, 16R) drive according to the operation directions and operation amounts thereof, so that the hydraulic shovel 1 can be made to travel. Further, by inclining backward and forward, and right and left in operation the left and right work operation levers 161, 162, the upper turning body 20 and the shovel device 30 are made to drive according to the operation directions and operation amounts thereof, so that work such as excavation can be performed.

A horn device 28 is provided on the front of the turning frame 21. By pressing a horn switch in the operator cabin 23, a warning tone to call attention can be emitted from the horn device 28 to the vicinity of the hydraulic shovel 1. At the back of the turning frame body 20, a mounting chamber, in which the main part of a working control device 100 described later is mounted, is provided behind the operator cabin 23. A counter weight 29 in a curved surface shape is provided to form the back wall of this mounting chamber.

Figure 2:
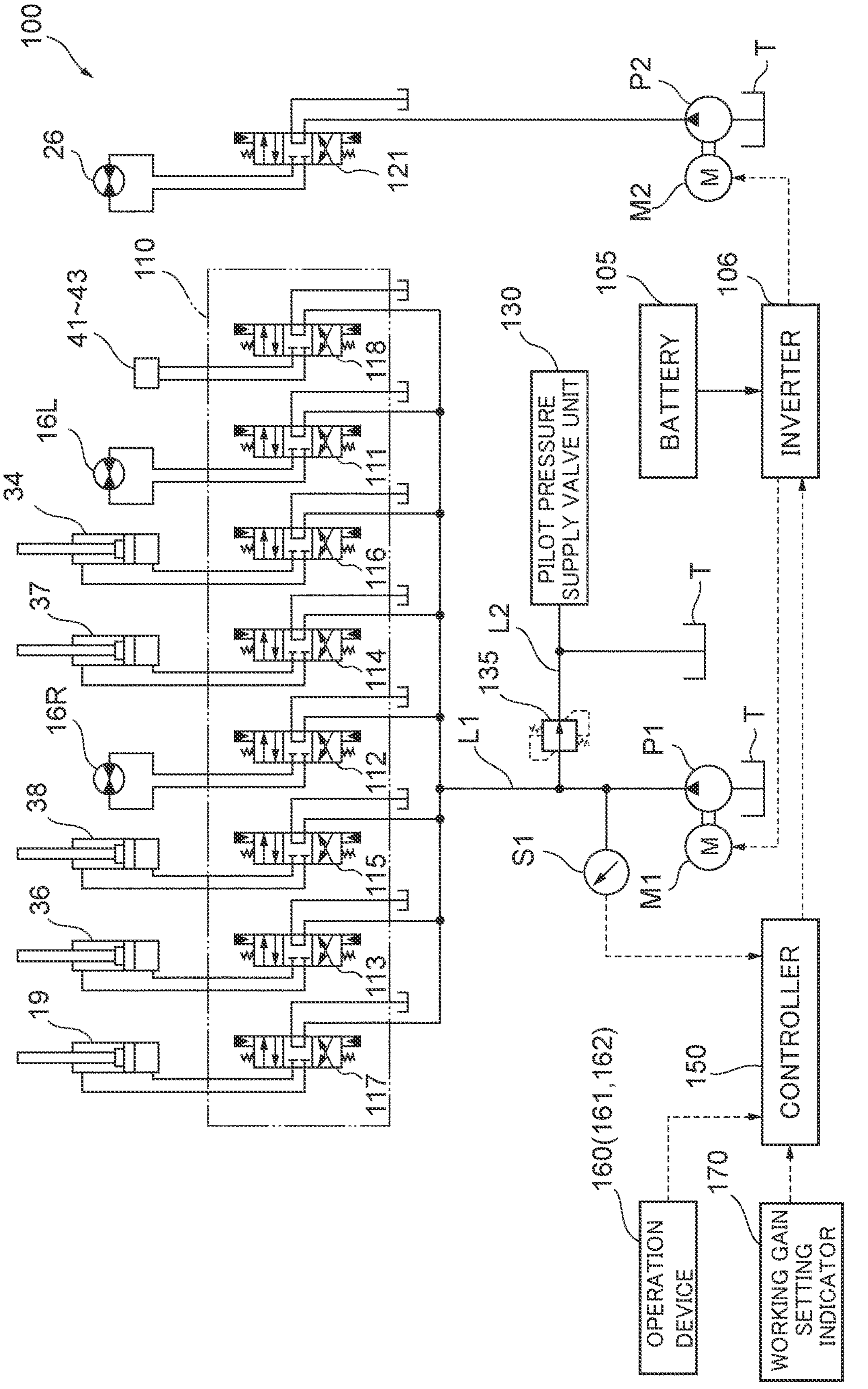
FIG. 2 is a hydraulic circuit diagram illustrating the working control device according to the present invention.

As shown in FIG. 2, the working control device 100 comprises a working oil tank T, a first hydraulic pump P1 to discharge working oil for making the left and right travelling motors 16L, 16R and the like work, a turning hydraulic pump P2 to discharge working oil only for making the turning motor 26 work, a control valve unit 110 to control the supply direction and flow rate of working oil discharged from the first hydraulic pump P1 and supplied to the left and right travelling motors 16L, 16R and the like, a turn control valve 121 to control the supply direction of working oil discharged from the turning hydraulic pump P2 and supplied to the turning motor 26, and a pilot pressure supply valve unit 130 to generate and supply pilot pressures for controlling the working of the control valve unit 110 and the turn control valve 121 respectively.

The control valve unit 110 comprises control valves to control the supply/discharge, supply directions, and flow rates of working oil supplied to the left and right travelling motors 16L, 16R, the boom cylinder 36, the arm cylinder 37, the bucket cylinder 38, the swing cylinder 34, the blade cylinder 19, and the first to third attachment connection ports 41 to 43 respectively. As these control valves, the unit 110 has left and right travel control valves 111, 112, a boom control valve 113, an arm control valve 114, a bucket control valve 115, a swing control valve 116, a blade control valve 117, and an attachment control valve 118. In each of these control valves 111 to 118, the incorporated spool is moved by a pilot pressure supplied from the pilot pressure supply valve unit 130, and by the movement of the spool, the supply/discharge, supply direction, and flow rate of working oil supplied to each hydraulic actuator can be controlled.

In the turn control valve 121, as in the control valves 111 to 118, the incorporated spool is moved by a pilot pressure supplied from the pilot pressure supply valve unit 130. In the turn control valve 121, by the movement of the spool, only the supply/discharge and supply direction of working oil supplied to the turning motor 26 are controlled to switch. The flow rate control of working oil supplied to the turning motor 26 (that is, the turn speed control of the upper turning body 20) is performed by the rotation control of a second electric motor M2 described later.

The pilot pressure supply valve unit 130 is provided in a branch oil passage L2 branching off from a pump oil passage L1 leading from the discharge port of the first hydraulic pump P1 to the control valve unit 110. In the branch oil passage L2, a check valve 135 to keep oil pressure necessary for the pilot pressure supply valve unit 130 to generate pilot pressures is provided. With use of working oil discharged from the first hydraulic pump P1, the pilot pressure supply valve unit 130 generates pilot pressures according to the respective operation directions and operation amounts of the travel operation levers (travel operation pedals), the work operation levers 161, 162, and the blade operation lever provided in the operator cabin 23 and supplies to the corresponding control valves. The pilot pressure supply valve unit 130 has a plurality of electromagnetic proportional pilot pressure supply valves (described in detail later) for supplying the pilot pressures to the corresponding control valves.

The working control device 100 further comprises a first electric motor M1 to drive the first hydraulic pump P1, the second electric motor M2 to drive the turning hydraulic pump P2, a battery 105 (a storage battery) rechargeable from an external power supply or the like, an inverter 106 that converts DC power from the battery 105 into AC power to change frequency and the magnitude of voltage, a first pressure sensor S1 to detect the pressure (pump pressure) of working oil discharged from the first hydraulic pump P1, a controller 150 to perform a variety of control (described in detail later), the above-mentioned operation device 160, and the working gain setting indicator 170.

The first and turning hydraulic pumps P1, P2 are each a fixed-capacity-type hydraulic pump and discharge working oil of flow rates according to the output of the first and second electric motors M1, M2. A variable-capacity-type hydraulic pump can be used as the first and turning hydraulic pumps P1, P2.

Figure 3:
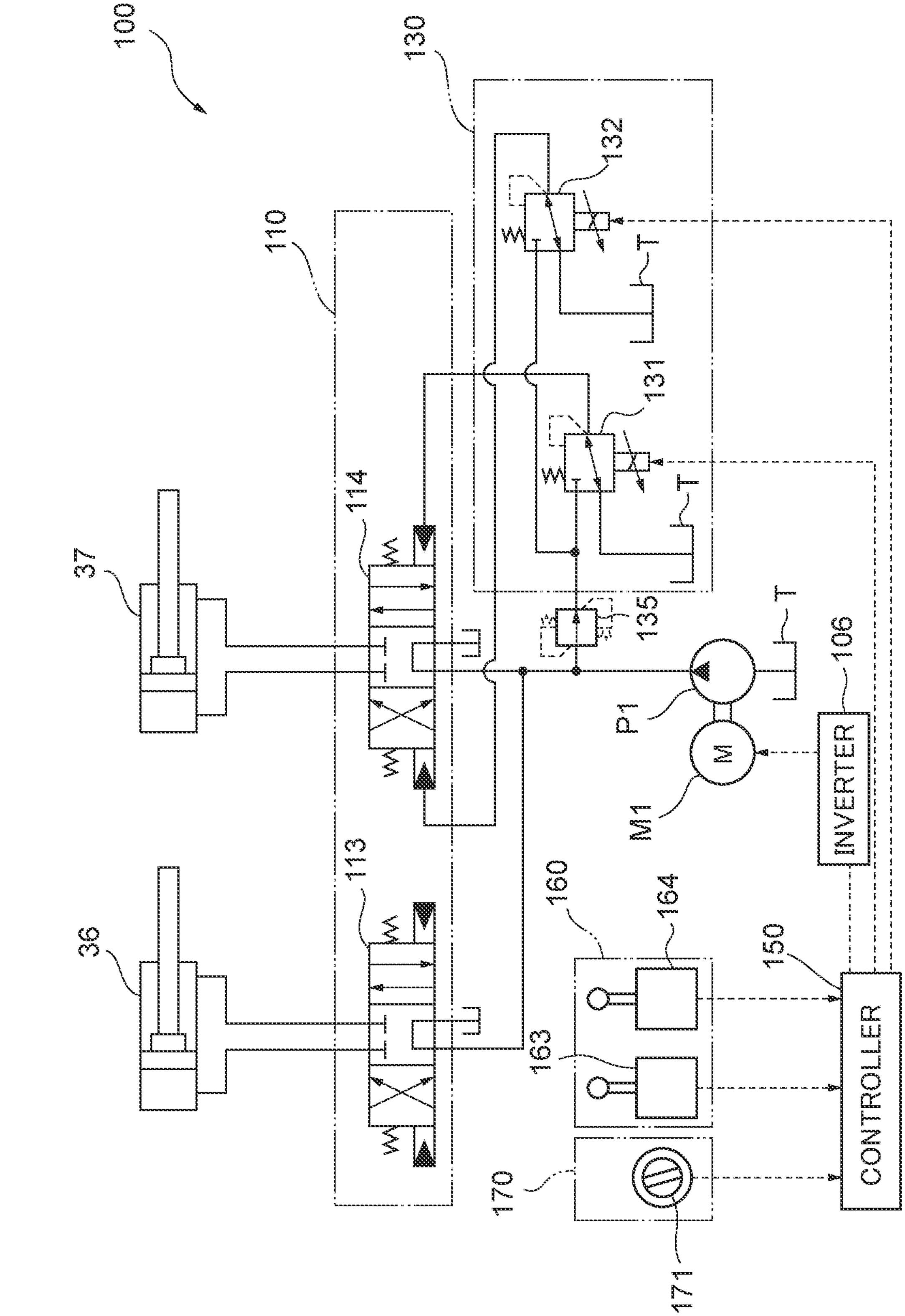
FIG. 3 is a hydraulic circuit diagram in which a configuration where a controller performs working control of a boom cylinder and an arm cylinder in the working control device is extracted and illustrated.

Then, a control content by the controller 150 will be described. As described above, when the operator who has gotten in the operator cabin 23 operates the work operation levers 161 and 162 of the operation device 160 backward and forward and right and left, the upper turning body 20 and the shovel device 30 are worked depending on operation directions and operation amounts thereof so that work such as excavation can be performed. Hereinafter, working control in a case where a boom operation lever 163 and an arm operation lever 164 have been respectively operated in the work operation levers 161 and 162 will be described as an example with reference to FIG. 3. FIG. 3 is a hydraulic circuit diagram for describing a control content in a case where the controller 150 performs working control of the boom cylinder 36 and the arm cylinder 37. In FIG. 3, components required to describe the control content are extracted and illustrated, and only the boom operation lever 163 and the arm operation lever 164 are illustrated as the operation device 160.

In FIG. 3, the working gain setting indicator 170 is also illustrated. The working gain setting indicator 170 includes a gripping operation section 171 that can be operated to rotate within a predetermined angular range while being pinched by an operator with his/her fingers, and is configured to output a working gain instruction signal corresponding to an operation amount (rotation angle position) of the gripping operation section 171 to the controller 150. The working gain signal is an instruction signal for setting a working speed gain, described below, in the controller 150. The controller 150 can set the working speed gain in response to the working gain signal.

Each of the boom operation lever 163 and the arm operation lever 164 is a joystick type operation lever, and outputs an operation output signal corresponding to its operation to the controller 150. Specifically, an operation output signal for making the boom cylinder 36 work is outputted when the boom operation lever 163 is operated, and an operation output signal for making the arm cylinder 37 work is outputted when the arm operation lever 164 is operated. Each of the operation levers 163 and 164 is configured to be responsive to its operation amount (operation stroke) to output such an operation output signal that the larger the operation amount is, the higher a signal level (e.g., a voltage value or a current value) is.

The operation output signals to be thus respectively outputted according to the operations of the boom and arm operation levers 163 and 164 are fed to the controller 150, and a number (speed) of driving revolutions of the first electric motor M1 is controlled via the inverter 106. Further, working control of the boom control valve 113 and the arm control valve 114 is performed via the pilot pressure supply valve unit 130, so that the boom cylinder 36 and the arm cylinder 37 are controlled to work.

Figure 4:
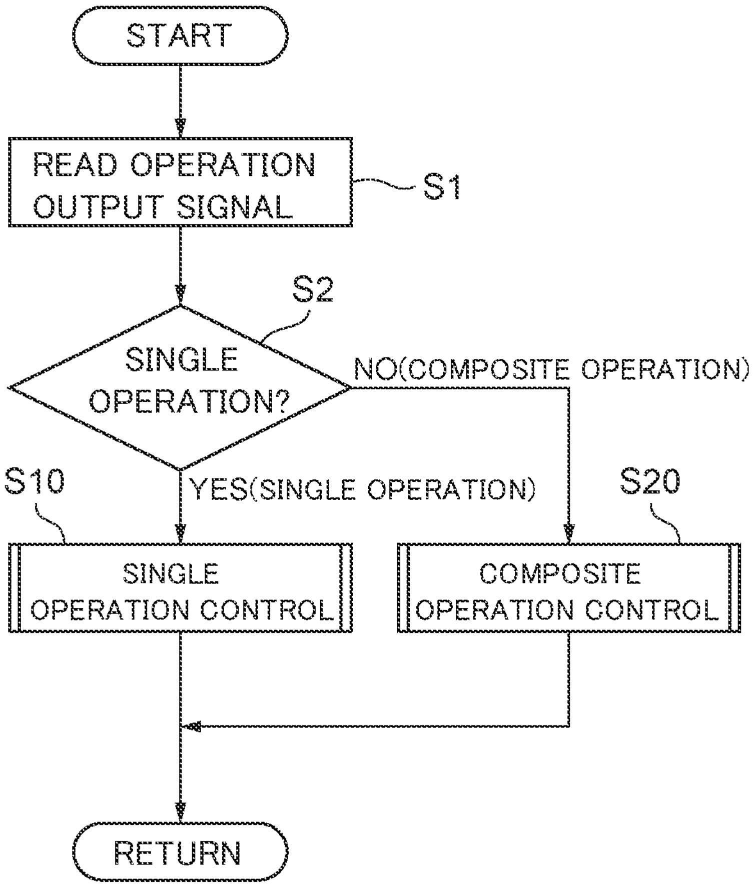
FIG. 4 is a flowchart illustrating driving rotation control of a first electric motor according to respective operations of boom and arm operation levers.
Figure 6:
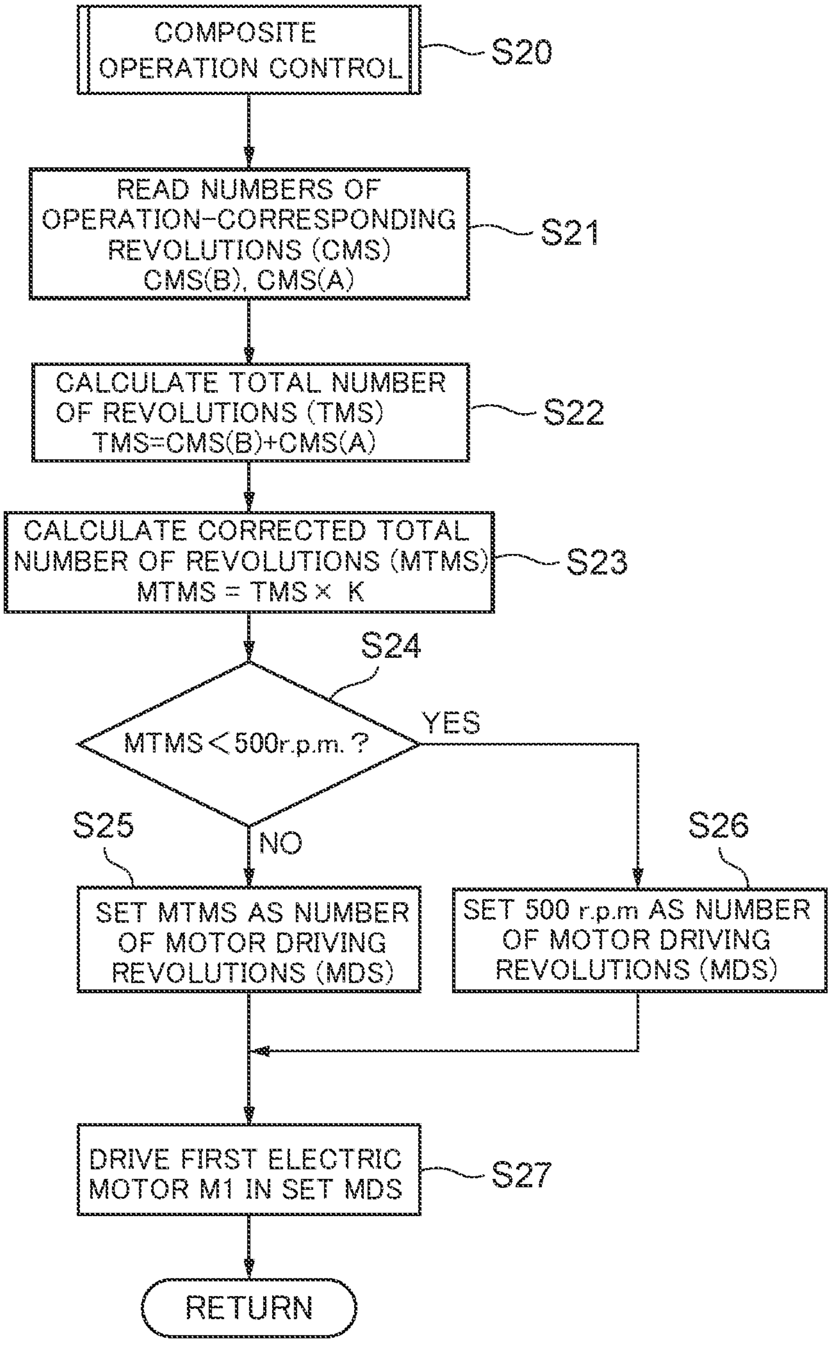
FIG. 6 is a flowchart illustrating composite operation control constituting the driving rotation control.
Figure 7:
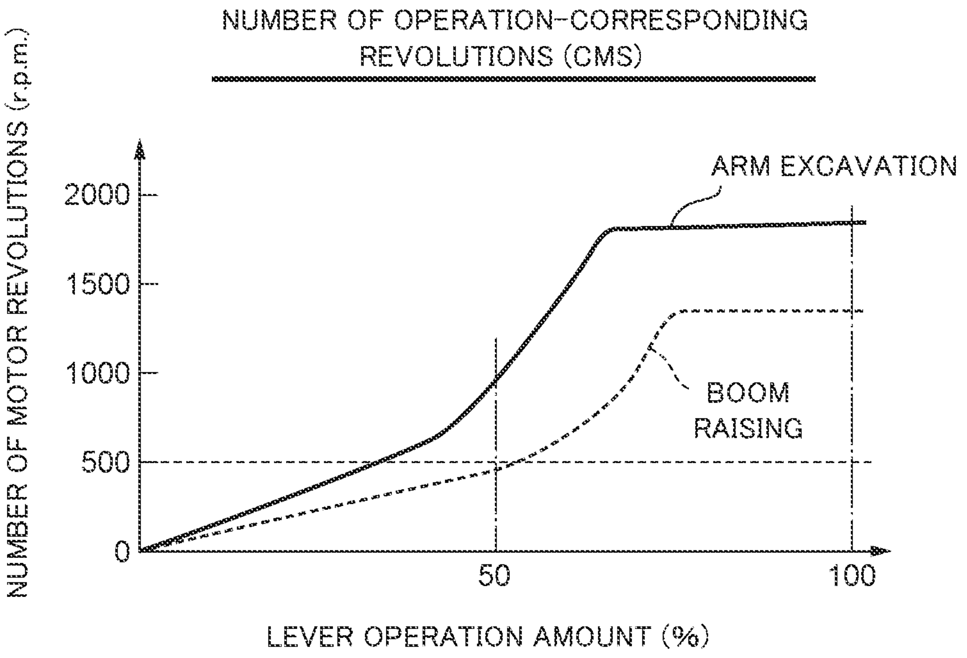
FIG. 7 is a graph illustrating a setting relationship between a lever operation amount and a number of motor revolutions.
Figure 8:
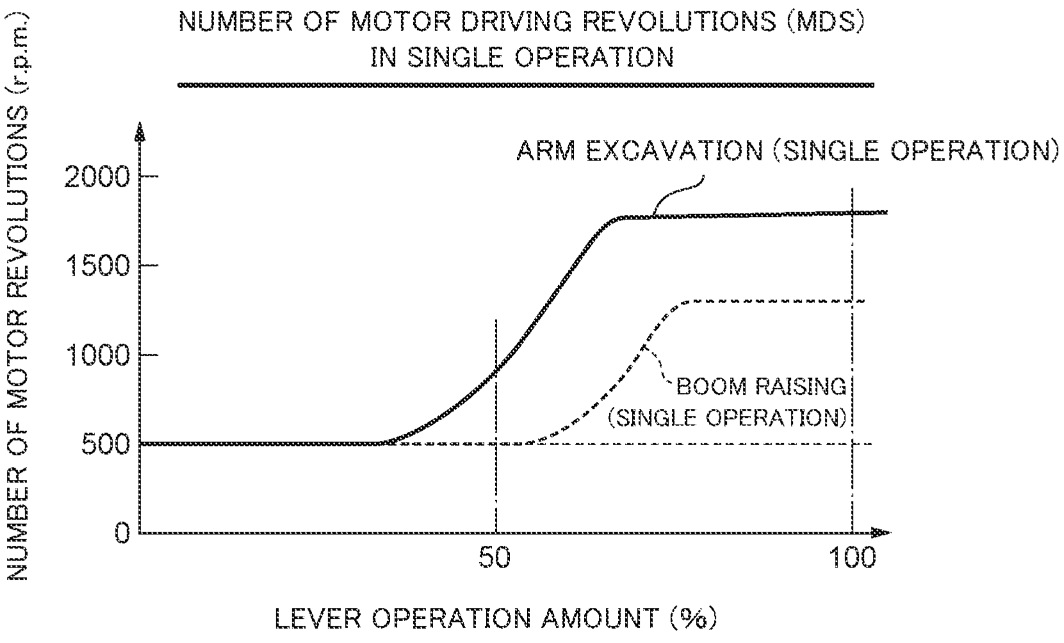
FIG. 8 is a graph illustrating a relationship between a lever operation amount and a number of motor driving revolutions in a single operation.

First, driving rotation control of the first electric motor M1 according to the respective operations of the boom and arm operation levers 163 and 164 to be performed by the controller 150 will be described with reference to flowcharts of FIG. 4 to FIG. 6 and graphs of FIG. 7 to FIG. 8. In the driving rotation control, the operation output signal to be fed from each of the boom and arm operation levers 163 and 164 is first read according to a lever operation (step S1), and it is determined whether the operation is a single operation in which only any one lever operation is performed or a composite operation in which a plurality of lever operations are simultaneously performed (step S2). Single operation control illustrated in FIG. 5 is performed when the operation is the single operation (step S10), and composite operation control illustrated in FIG. 6 is performed when the operation is the composite operation (step S20).

Figure 5:
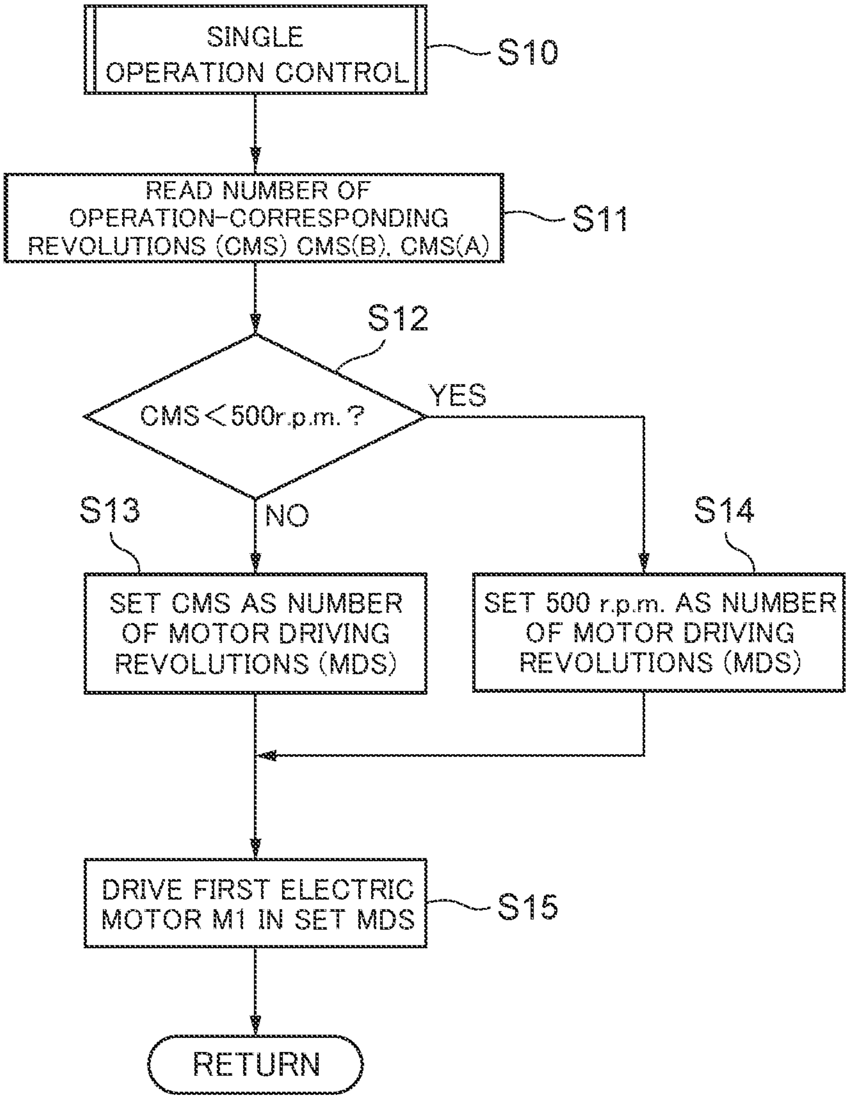
FIG. 5 is a flowchart illustrating single operation control constituting the driving rotation control.

When the operation is the single operation, a number (speed) of operation-corresponding revolutions CMS is first found (step S11), as illustrated in FIG. 5. The number of operation-corresponding revolutions CMS is previously set and stored to correspond to a lever operation amount, as illustrated in FIG. 7. An operation amount (%) is found from the operation output signal read in step 1, and a number (speed) of corresponding revolutions corresponding to the operation amount is found from a relationship illustrated in FIG. 7. As illustrated in FIG. 7, the number of operation-corresponding revolutions is set for each lever operation (for each hydraulic actuator as an operation target by the lever operation). A characteristic as indicated by a solid line in FIG. 7 is set when the arm 32 is made to work in an excavation direction, for example, and a characteristic as indicated by a broken line in FIG. 7 is set when the arm 32 is made to work in a direction in which the boom 31 is raised. Accordingly, when a single lever operation for making the arm 32 work in the excavation direction has been performed, a number (speed) of arm excavation operation-corresponding revolutions CMS(A) corresponding to the lever operation is found from the characteristic indicated by the solid line in FIG. 7. When the single lever operation for making the boom 31 work in a boom raising direction has been performed, a number (speed) of boom raising operation-corresponding revolutions CMS(B) corresponding to the lever operation is formed from the characteristic indicated by the broken line in FIG. 7.

Then, the program proceeds to step S12. In step S12, it is determined whether or not the number of operation-corresponding revolutions CMS (CMS(A) or CMS(B)) thus found is less than a necessary minimum number of revolutions (e.g., a value of approximately 500 to 700 r.p.m.) required when the first hydraulic pump P1 is driven. When the number of operation-corresponding revolutions CMS is the necessary minimum number of revolutions or more, the program proceeds to step S13. In step S13, the found number of operation-corresponding revolutions CMS is set as a number of motor driving revolutions MDS. On the other hand, when the number of operation-corresponding revolutions CMS is less than the necessary minimum number of revolutions, the program proceeds to step S14. In step S14, the necessary minimum number of revolutions is set as the number of motor driving revolutions MDS. The first electric motor M1 is rotated in the number of motor driving revolutions MDS thus set (step S15). A number of motor driving revolutions corresponding to a lever operation amount of the single lever operation to be thus performed is illustrated in FIG. 8.

Then, the composite operation control (step S20) to be performed when the operation is the composite operation will be described with reference to FIG. 6. When the operation is the composite operation, numbers of operation-corresponding revolutions CMS (CMS(A) and CMS(B)) respectively corresponding to lever operations are found (step S21). The number of operation-corresponding revolutions CMS is previously set and stored to correspond to a lever operation amount, as illustrated in FIG. 7, as described above, and a number of corresponding revolutions respectively corresponding to operation amounts of the lever operations constituting the composite operation is found. A case where a composite operation of a lever operation for making an arm work in an excavation direction and a lever operation for making the boom work in a boom raising direction has been performed will be described as an example. In step S21, a number of arm excavation operation-corresponding revolutions CMS(A) corresponding to the lever operation for making the arm work in the excavation direction and a number of boom raising operation-corresponding revolutions CMS(B) corresponding to the lever operation for making the boom work in the boom raising direction are found.

The program proceeds to step S22. In step S22, a total number of revolutions TMS (=CMS(A)+CMS(B)) is calculated. The program further proceeds to step S23. In step S23, the calculated total number of revolutions TMS is multiplied by a correction coefficient K (<1.0), to calculate a corrected total number of revolutions MTMS. The correction coefficient K is set to a value of approximately 0.5 to 0.9. This prevents occurrence of a situation where when the operation is the composite operation and the operation amount is large, the total number of revolutions is too large and exceeds an allowable number of revolutions of a hydraulic pump. As a result, the correction coefficient K is appropriately set depending on various types of conditions.

Then, the program proceeds to step S24. In step S24, it is determined whether or not the corrected total number of revolutions MTMS thus found is less than a necessary minimum number of revolutions (e.g., a value of approximately 500 to 700 r.p.m.) required when the first hydraulic pump P1 is driven. When the number of operation-corresponding revolutions CMS is the necessary minimum number of revolutions or more, the program proceeds to step S25. In step S25, the found corrected total number of revolutions MTMS is set as a number of motor driving revolutions MDS. On the other hand, when the corrected total number of revolutions MTMS is less than the necessary minimum number of revolutions, the program proceeds to step S26. In step S26, the necessary minimum number of revolutions is set as the number of motor driving revolutions MDS. The first electric motor M1 is rotated in the number of motor driving revolutions MDS thus set (step S27).

Then, working control of the boom cylinder 36 and the arm cylinder 37 to be performed by the controller 150 that has received an operation output signal outputted according to respective operations of the boom and arm operation levers 163 and 164 will be described. The controller 150 that has received the operation output signal outputted according to the operations of the boom and arm operation levers 163 and 164 performs working control of the boom control valve 113 and the arm control valve 114 via the pilot pressure supply valve unit 130 so that the boom cylinder 36 and the arm cylinder 37 are controlled to work.

The boom control valve 113 and the arm control valve 114 illustrated in FIG. 3 respectively control supply directions and flow rates of working oil to be supplied to the boom cylinder 36 and the arm cylinder 37 upon control of movement positions of incorporated spools by pilot pressures to be supplied from pilot pressure supply valves 131 and 132 in the pilot pressure supply valve unit 130. The pilot pressure supply valves 131 and 132 are each an electromagnetic proportion pilot pressure control valve. They are worked in response to a pilot pressure control signal from the controller 150, to respectively control pilot pressures to be supplied to the boom control valve 113 and the arm control valve 114 and control workings of the valves.

Figure 9:
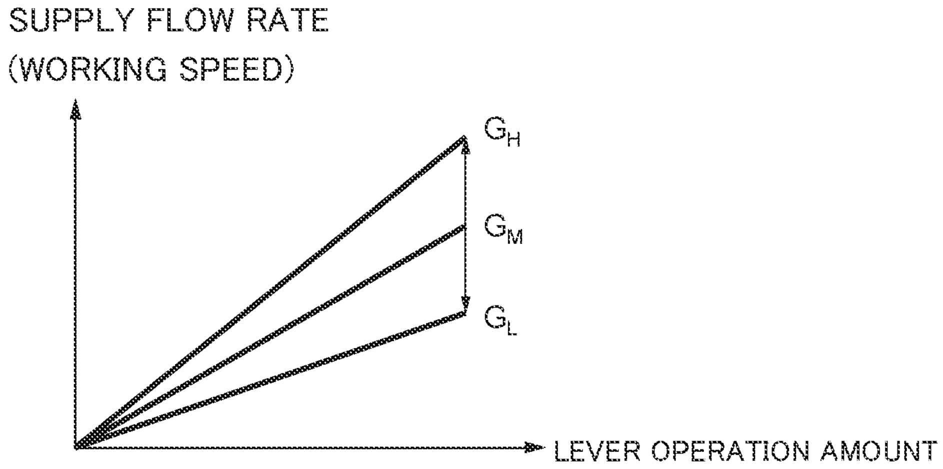
FIG. 9 is a graph illustrating a relationship between a lever operation amount and a working speed depending on a working gain.

In the present embodiment, control to which a working speed gain set by the working gain setting indicator 170 is added is performed. When the gripping operation section 171 in the working gain setting indicator 170 is operated to rotate by the operator, setting of the working speed gain is adjusted by the controller 150. The working speed gain is set as a parameter (e.g., a coefficient) for determining a correspondence between the operation amount of the operation lever in the operation device 160 and a working speed of the corresponding hydraulic actuator (a supply flow rate of working oil to be supplied to the hydraulic actuator). When the setting of the working speed gain is changed depending on a rotation angle position of the gripping operation section 171, a supply flow rate (working speed) to the hydraulic actuator corresponding to the same operation amount can be adjusted, as illustrated in FIG. 9. Although the supply flow rate to the hydraulic actuator is set to linearly (proportionally) change with respect to the operation amount in FIG. 9, various characteristic settings can be performed in view of various conditions for the setting. Although the supply flow rate linearly changes in a region where the operation amount is small, for example, the supply flow rate may be set to change in a curved shape when it increases.

Although the embodiment of the present invention has been described above, the scope of the present invention is not limited to the above embodiment. For example, although the above embodiment describes the configuration where the opening degrees of the control valves 111 to 118 are controlled by pilot pressures supplied from the pilot pressure supply valve unit 130, a configuration may be made where, with electromagnetic proportional control valves as the control valves 111 to 118, the opening degrees of the control valves 111 to 118 are controlled electromagnetically. Or the opening degrees of the control valves 111 to 118 may be controlled using a drive device such as an electric motor. Although the above embodiment describes the configuration where pilot pressures are generated using working oil from the first hydraulic pump P1, a configuration may be made where a pilot hydraulic pump, driven together with the first hydraulic pump P1 by the first electric motor M1, is provided and where pilot pressures are generated using working oil from this pilot hydraulic pump.

A configuration may be made where the setting (initial setting) of a working characteristic of the hydraulic actuator for the operation of an operation lever can be changed for each hydraulic actuator. For example, in order to change the setting of the correspondence relation between the operation amount of an operation lever and the working speed (the amount of supplied oil) of the corresponding hydraulic actuator, a configuration may be made where the setting of the necessary discharge flow rate-operation amount ratio can be changed or where the setting of the working speed gain value can be changed. A configuration can be made where this setting change is performed via, e.g., a portable computer (having a program to change the setting incorporated therein) or the like electrically connected to the controller 150.

Further, a configuration may be made where, when the crawler mechanisms 15 or the shovel device 30 are made to work at the same time as the turning operation of the upper turning body 20, control is performed to decrease the discharge flow rate of the first hydraulic pump P1 by the magnitude of the discharge flow rate of the turning hydraulic pump P2 (to decrease the horsepower of the first hydraulic pump P1 by the magnitude of the horsepower of the turning hydraulic pump P2). Although the above embodiment illustrates an example where the present invention is applied to the hydraulic shovel, the present invention can be applied to working vehicles other than hydraulic shovels likewise to obtain the same effect.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

RELATED APPLICATIONS

This invention claims the benefit of Japanese Patent Application No. 2021-157321 which is hereby incorporated by reference.

EXPLANATION ABOUT NUMERALS AND CHARACTERS

1 hydraulic shovel
10 lower travelling unit
16L, 16R travelling motor
20 upper turning body
26 turning motor
30 shovel device
36 boom cylinder
37 arm cylinder
37 bucket cylinder
100 working control device
110 control valve unit
130 pilot pressure supply valve unit
150 controller
160 operation device
170 working gain setting indicator
M1 first electric motor
M2 second electric motor
P1 first hydraulic pump
P2 turning hydraulic pump

What is claimed is:

1. In a working vehicle comprising a hydraulic working device,
a working control device comprising a plurality of hydraulic actuators for driving the hydraulic working device, an operation device including an operation lever for making the plurality of hydraulic actuators selectively or compositely work to drive the hydraulic working device, a working oil supply source that delivers working oil for driving the plurality of hydraulic actuators, and a controller that controls an amount of oil to be delivered from the working oil supply source, wherein
the working oil supply source includes an electric motor and a hydraulic pump to be driven by the electric motor,
the controller is configured to perform rotation control of the electric motor according to an operation of the operation device to control an amount of oil to be delivered from the hydraulic pump,
when the operation device is subjected to a single operation for making any one of the plurality of hydraulic actuators selectively work, a number (speed) of operation-corresponding motor revolutions corresponding to an operation amount of the operation device is set, and a necessary minimum number of revolutions is set instead of the number of operation-corresponding motor revolutions when the number of operation-corresponding motor revolutions is the necessary minimum number of revolutions or less, to perform driving control of the electric motor such that the number of revolutions thus set is obtained, and
when the operation device is subjected to a composite operation for making two or more of the plurality of hydraulic actuators compositely work, a total number of motor revolutions obtained by summing numbers of operation-corresponding motor revolutions respectively corresponding to operation amounts in the composite operation is set, and the necessary minimum number of revolutions is set instead of the total number of motor revolutions when the total number of motor revolutions is the necessary minimum number of revolutions or less, to perform driving control of the electric motor such that the number of revolutions thus set is obtained.

2. The working control device in the working vehicle according to claim 1, wherein the necessary minimum number of revolutions is a minimum number of driving revolutions found when the hydraulic pump is driven.

3. The working control device in the working vehicle according to claim 1, wherein the number of operation-corresponding motor revolutions set when the operation device is singly operated is set for each of the plurality of hydraulic actuators.

4. The working control device in the working vehicle according to claim 1, wherein the numbers of operation-corresponding motor revolutions set when the operation device is compositely operated are respectively set for the plurality of hydraulic actuators.

5. The working control device in the working vehicle according to claim 1, wherein when the operation device is subjected to the composite operation for making two or more of the plurality of hydraulic actuators compositely work, a value obtained by multiplying a value obtained by summing the numbers of operation-corresponding motor revolutions respectively corresponding to the operation amounts in the composite operation by a predetermined coefficient K (K<1.0) is set as the total number of motor revolutions.

6. The working control device in the working vehicle according to claim 1, further comprising a plurality of working oil supply control valves that are respectively provided in an oil path leading to the plurality of hydraulic actuators from the hydraulic supply source and each perform working oil supply control to the corresponding hydraulic actuator among the plurality of hydraulic actuators according to a selective or composite operation of the plurality of hydraulic actuators.

7. The working control device in the working vehicle according to claim 6, wherein the hydraulic pump is a fixed-capacity hydraulic pump.

8. The working control device in the working vehicle according to claim 6, wherein the hydraulic pump is a variable-capacity hydraulic pump.

* * * * *